United States Patent
Hermstein

[11] 3,919,626
[45] Nov. 11, 1975

[54] MEASURING TRANSFORMER ARRANGEMENT

[75] Inventor: Wolfgang Hermstein, Nuremberg, Germany

[73] Assignee: Siemens Aktiengesellschaft, Munich, Germany

[22] Filed: May 17, 1974

[21] Appl. No.: 470,902

[30] Foreign Application Priority Data
May 17, 1973 Germany............................ 2325442

[52] U.S. Cl. .................. 323/93; 307/147; 307/149
[51] Int. Cl.² ................. H01F 40/08; H01F 40/10; H01F 27/00; H01B 9/06
[58] Field of Search ..... 307/147, 149; 174/DIG. 10; 336/173, 174, 175

[56] References Cited
UNITED STATES PATENTS

| 1,873,977 | 8/1932 | Naef ............................ 174/DIG. 10 |
| 2,957,150 | 10/1960 | Jennings et al. ..................... 336/174 |
| 3,082,389 | 3/1963 | Settles et al. ........................ 336/173 |
| 3,374,434 | 3/1968 | Perry ................................. 336/175 |
| 3,683,302 | 8/1972 | Butler et al. ........................ 336/175 |
| 3,701,003 | 10/1972 | Anderson............................ 336/175 |
| 3,746,935 | 7/1973 | Wagenaar .................... 174/DIG. 10 |
| 3,795,820 | 3/1974 | Eldinger............................. 307/147 |

FOREIGN PATENTS OR APPLICATIONS

259,231 8/1927 United Kingdom......... 174/DIG. 10

*Primary Examiner*—L. T. Hix
*Attorney, Agent, or Firm*—Kenyon & Kenyon Reilly Carr & Chapin

[57] ABSTRACT

A measuring transformer arrangement for several high-voltage conductors disposed in a gas-filled tube includes current transformer units corresponding to respective ones of the high-voltage conductors. The current transformer units form a cohesive structural unit and each current transformer unit has at least one iron core of its own with a secondary winding system mounted thereon. Each iron core of the current transformer units is shielded with respect to high-voltage from the corresponding high-voltage conductor by a control electrode which is at or near ground potential.

16 Claims, 5 Drawing Figures

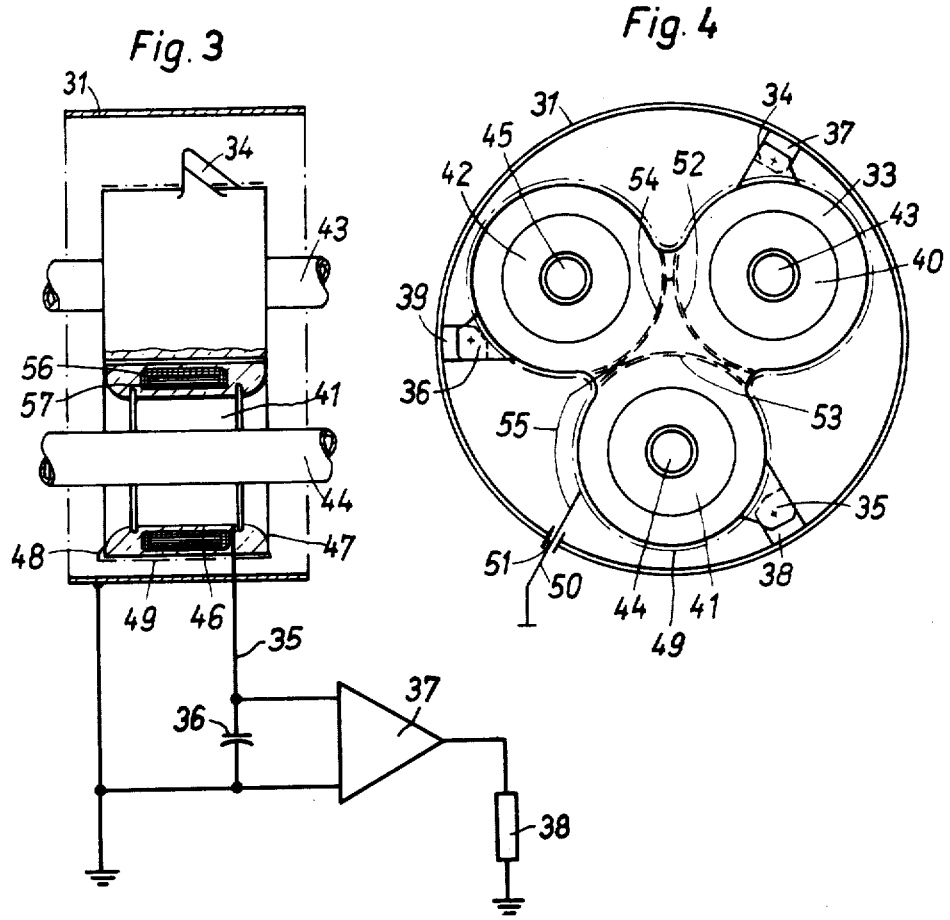

MEASURING TRANSFORMER ARRANGEMENT

BACKGROUND OF THE INVENTION

The invention relates to a measuring transformer arrangement for several high-voltage conductors disposed in a gas-filled tube. The measuring transformer arrangement includes current transformer units which correspond to respective ones of the high-voltage conductors and which form a cohesive structural unit.

A measuring transformer arrangement of this kind is disclosed in German Pat. No. 701,383 and includes a single iron core which has openings for bringing through the individual high-voltage conductors. Each high-voltage conductor is insulated from the common core by an insulator. The secondary windings of the known measuring transformer arrangements are mounted at those points of the common iron body whereat the magnetic flux generated by the current of the corresponding high-voltage conductor passes through. The transmission accuracy of such a measuring transformer arrangement is not very high because at least partial interlinking of the fluxes occurs due to the common iron body.

SUMMARY OF THE INVENTION

Accordingly, it is an object of the invention to provide a measuring transformer arrangement which overcomes the above-mentioned disadvantages associated with the prior art.

It is another object of the invention to provide a measuring transformer arrangement for several high-voltage conductors disposed in a gas-filled tube wherewith the currents in the individual high-voltage conductors can be measured with an accuracy such as is generally expected of current transformers. It is a further object of the invention to provide such a measuring transformer arrangement which is also in the form of a cohesive structural unit. It is still another object of the invention to provide a measuring transformer arrangement which is easily and economically manufactured.

The measuring transformer arrangement according to the invention is suitable for an installation having a gas-filled tube wherein several high-voltage conductors are contained.

The above-mentioned objects are realized in the measuring transformer arrangement of the invention by providing as a feature thereof that each measuring transformer unit has at least one iron core of its own with a secondary winding system mounted thereon; each iron core of the current transformer units is shielded against the high-voltage of the corresponding high-voltage conductor by means of a control electrode which is at or near ground potential.

The advantage of the measuring transformer arrangement according to the invention is primarily that a high transmission accuracy is ensured because an individual iron core with a secondary winding system mounted thereon is used for each high-voltage conductor. Furthermore, because use is made of a separate iron core with a secondary winding mounted thereon, the advantageous possibility is realized that in the production of the measuring transformer arrangement according to the invention, resort may be had to components which can also be used in measuring transformers for measuring the current in a single high-voltage conductor. Production is thereby simplified because the number of components required for building a relatively wide spectrum of equipments is attainable by means of relatively few different components.

Deutsche Offenlegungsschrift 2,116,608 discloses a multi-phase measuring transformer arrangement wherein an iron core with a secondary winding system mounted thereon is accommodated, for each high-voltage conductor, on projections of a common cast-resin structure which contains the high-voltage conductors; but these current transformers represent special designs of feedthrough current transformers and are therefore not comparable with the current transformer units of the measuring transformer arrangement according to the invention wherein the current transformer units are not feedthrough current transformers.

In the measuring transformer arrangement according to the invention it is considered as particularly advantageous if the gas in the tube carrying the high-voltage conductor is used as the insulating medium between the respective high-voltage conductors and the associated iron core with the secondary winding system mounted thereon; this affords the advantage of rendering special insulating material such as cast resin unnecessary for insulating the high-voltage conductor against the iron core. This has a favorable effect on the weight of the measuring transformer arrangement according to the invention and on manufacturing cost thereof.

In order to obtain a measuring transformer arrangement according to the invention with a configuration as compact as possible, the current transformer units or parts thereof are arranged side by side transversely to the longitudinal axis of the high-voltage installation. In this manner, a measuring transformer arrangement is obtained which has a dimension in the direction of the longitudinal axis of the gas-filled tube and so corresponds approximately with the same dimension of a single current transformer unit.

The measuring transformer arrangement according to the invention can be constructed with the advantages described above not only as a multi-phase current transformer, but also as a combined measuring transformer arrangement, if according to a further embodiment of the invention, devices for measuring the voltages at the high-voltage conductors, or parts of these devices, form components of the structural unit. A measuring transformer arrangement of such configuration can be made in a particularly advantageous manner if the control electrodes which are near ground potential are also utilized for the measurement of the voltages by letting them form, together with the corresponding high-voltage conductor, a high-potential capacitor of a corresponding capacitive voltage divider with a low-potential capacitor connected to the high-potential capacitor. This then results in a measuring transformer arrangement which contains inductive current transformer units in combination with capacitive voltage transformers.

Optionally, such a measuring transformer arrangement, which is suited for current and voltage measurement, can be configured according to the invention in such a manner that also the low-potential capacitors of the capacitive voltage dividers are combined in the structural unit, for instance, by arranging them next to the iron cores, for instance, as circularly wound capacitors. This affords the advantage that the high-potential capacitor as well as the low-potential capacitor are subjected to nearly the same temperature changes; this has a favorable effect on the constancy of the division ratio.

In the measuring transformer arrangement according to the invention the structural unit contains advantageously a common support body for the current transformer units and, if desired, for the devices for measuring the voltages or at least part of such devices. This support body need not consist of insulating material but can also be made of metal, and may, for instance, be a casting.

Although the invention is illustrated and described herein as a measuring transformer arrangement, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 3 illustrates another embodiment of the measuring transformer arrangement according to the invention wherein the transformer core units are embedded in a common body made of insulating material. This view includes a fragmentary breakout to show the transformer unit corresponding to one of the high-voltage conductors.

FIG. 4 illustrates an end view of the embodiment illustrated in FIG. 3.

DESCRIPTION OF THE PREFERRED EMBODIMENTS OF THE INVENTION

Figure 1:
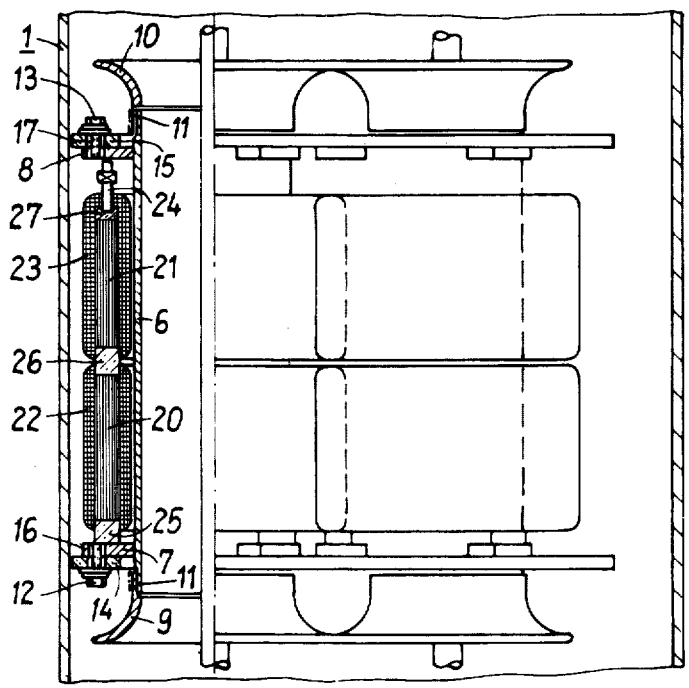
FIG. 1 is a schematic diagram showing an elevation view of the measuring transformer arrangement according to the invention configured as a combined current and voltage transformer. This view includes a portion which is drawn in section and shows how the transformer core units can be mounted.
Figure 2:
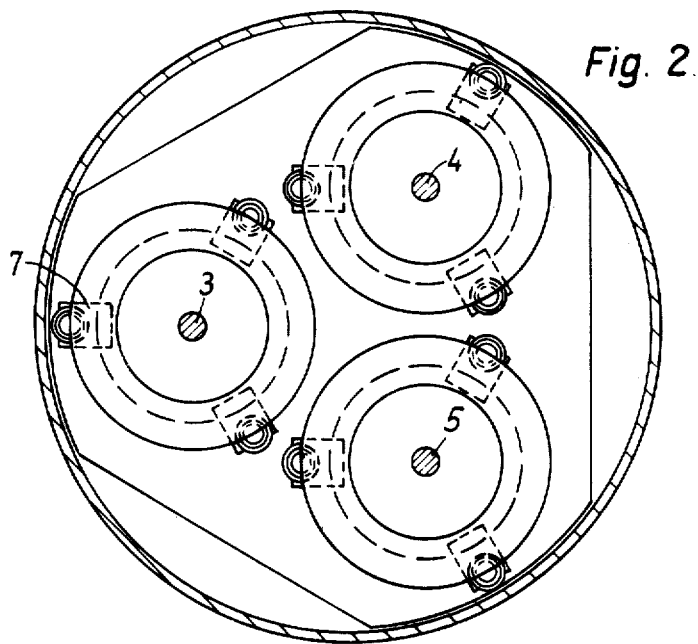
FIG. 2 illustrates an end view of the embodiment shown in FIG. 1.

In the embodiment of the invention shown in FIGS. 1 and 2, three high-voltage conductors 3, 4 and 5 are disposed in a gas-filled tube 1. Each of the high-voltage conductors 3 to 5 is surrounded by a tube 6 in the form of a metal tube as the control electrode close to ground potential. The tubes 6 are each provided at one end with fastening shoulders 7 and at the other end with further fastening shoulders 8. At the respective ends of the tubes 6, a tube part 9 and a further tube part 10 are cemented on; the tube parts 9 and 10 are bent outward at the outer end and form guard ring-electrodes because they carry a layer of insulation 11 at the surfaces cemented to the tube 6 and are therefore insulated with respect to the tubes 6.

The fastening shoulders 7 and 8 of the tubes 6 are connected by means of screws 12 and 13 with support discs 14 and 15. The support discs 14 and 15, one of which is solidly connected with the tube 1 in a manner not shown, while the other one rests against the tube 1 as a support element, are made of insulating material in order to void a metallic connection between the tubes 6 and the tube 1, which is grounded. In order to make possible a centering of the individual tubes 6 with respect to the high-voltage conductors 3 to 5 arranged therein, the support discs 14 and 15 are provided with holes having a diameter larger than the screw 13. For centering, it is therefore possible to shift the individual tubes 6 in the radial direction into the centered position before tightening the screws 12 and 13.

As may be seen particularly in FIG. 2, each tube 6 is provided at each end region thereof with three fastening shoulders 7 and 8 which are uniformly distributed over the circumference of the tube 6.

For each tube within the constricted region defined by the tube 6 and the two tube parts 9 and 10 are accommodated an iron core 20 and a further iron core 21 having secondary winding systems 22 and 23, respectively. The cores 20 and 21 are held in the region in question by means of a clamping device 24 in the form, for example, of pressure screws. By means of the clamping device, the iron cores are braced via interposed pressure pieces 25, 26 and 27 between the respective fastening shoulders 7 and 8. At the output terminals (not shown) of the secondary winding systems a measurement quantity can then be taken off which corresponds to the current through the respective high-voltage conductors 3 to 5 in the tube 1.

For measuring voltage, the tube 6, which forms a control electrode close to ground potential in each case, is also utilized in the illustrated embodiment as a high-voltage capacitor of a capacitive voltage divider. The tube 6 and the corresponding high-voltage conductor contained therein conjointly define the high-voltage capacitor in each instance. The low-potential capacitor for each capacitive voltage divider may be arranged outside the gas-filled tube. An amplifier is usually connected to the low-potential capacitor.

Deviating from this, however, it is also possible to configure the low-potential capacitor as a circularly wound capacitor and to arrange it likewise in the constricted region defined by the tube and the tube parts. It is therefore only necessary to be sure that the tube is made correspondingly long. The advantage of this solution is that no additional space is required outside the tube for accommodating the low-potential capacitor. A further advantage of this solution is that the low-potential capacitor is subjected to the same temperature changes as the high-potential capacitor which has a favorable effect on the constancy of the division ratio of the capacitive voltage divider.

In the measuring transformer arrangement according to the invention as shown in FIGS. 1 and 2, the tubes 6 therefore form with the support discs 14 and 15 as well as with the iron cores 20 and 21 with secondary winding systems 22 and 23 mounted thereon, respectively, a cohesive structural unit which can be prefabricated by itself and can then be placed with relatively little effort in the gas-filled tube.

In the embodiment of the measuring transformer arrangement according to the invention shown in FIGS. 3 and 4, a common insulator body 33 which has mounting projections 34, 35 and 36 is disposed in a gas-filled tube 31. The mounting projections 34, 35 and 36 are connected by means of fastening angles 37, 38 and 39, respectively to the gas-filled tube 31. Attachment can be achieved, for example, with screws. Thus, the common insulator body 33 is held securely in the gas-filled tube 31.

The common insulator body 33 has passage openings 40, 41 and 42, through which the high-voltage conductors 43, 44 and 45 are brought. Within the passage openings 40 to 42 are placed on the common insulator body 33 electrodes 46 of extended area as a control electrode near ground potential, which represents a cylindrical electrode. On both sides of the extended-area electrode 46, there are guard ring-electrodes 47 and 48. The guard ring-electrodes 47 and 48 are connected with a conducting coating 49 which is applied to the outer surface of the common insulator body 33 and is grounded. It will be seen from FIG. 4 that the ground connection is established by means of a ground line 50 which is brought out in an insulated manner to ground through an opening 51 in the gas-filled tube 31. This kind of grounding has the advantage that the influence of stray currents and voltages circulating in the gas-filled tube 31 on the transmission behavior of the measuring transformer arrangement according to the invention is eliminated.

As will be seen particularly in FIG. 4, potential shields 52, 53 and 54 are arranged inside the insulator body 33 in the path extension of the conducting coating 49. These potential shields, which are preferably formed of perforated sheet metal, are metallically connected with each other and are brought to the ground line 50 by means of a line 55 and are therefore grounded also. Through the outer conductive coating 49 and the potential shields 52 to 54, mutual decoupling of the high-potential capacitors formed by the extended-area electrode 46 and the corresponding high-voltage conductors 43 to 45 is achieved and it is thus prevented that interference voltages are measured along with the voltage at the corresponding high-voltage conductor.

A capacitive voltage divider is formed by connecting the extended-area electrode 46 to a low-voltage capacitor 36 by means of a connecting line 35. The low-potential capacitor 36 can be arranged outside the metal enclosure 31 and is followed by an amplifier 37. A load 38, which can be realized by a measuring instrument or a protective device, is connected to the amplifier 37.

The cut-away portion of FIG. 3 shows an iron core 56 with a secondary winding system 57 mounted thereon embedded in the common insulator body 33 in surrounded relation to the high-voltage conductor 44. The transformer units corresponding to high-voltage conductors 43 and 45 are likewise embedded in the common insulator body 33. The iron cores 56 with respective secondary winding systems 57 mounted thereon and the corresponding high-voltage conductors 43 to 45 conjointly define respective current transformer units.

In the embodiment of the measuring transformer arrangement according to the invention shown in FIGS. 3 and 4, a cohesive structural unit is achieved by means of the common insulator body 33 which supports the iron cores with the secondary winding system mounted thereon as well as the control electrodes.

Figure 5:
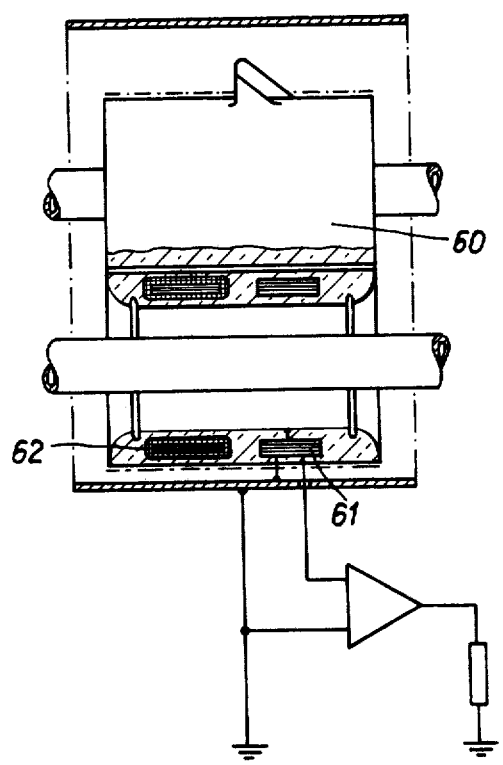
FIG. 5 illustrates another embodiment of the measuring transformer arrangement wherein the low voltage capacitor is combined in the common insulator body.

If desired, the low-voltage capacitor of the capacitive voltage divider can be combined in a common insulator body 60 (FIG. 5), for instance, by arranging the low-voltage capacitor 61 next to the corresponding iron core 62. The low-potential capacitor 61 in this instance can, for example, be configured as a circularly wound capacitor.

The invention provides a measuring transformer arrangement for several high-voltage conductors disposed in a gas-filled tube which is distinguished by high transmission accuracy, notwithstanding the fact that the measuring transformer arrangement forms a cohesive structural unit; this feature being of particular advantage with regard to installation.

What is claimed is:

1. A measuring transformer arrangement for an installation having a gas-filled tubular enclosure wherein a plurality of high-voltage conductors are arranged, the measuring voltage arrangement comprising: a plurality of current transformer units corresponding to respective ones of the high-voltage conductors; structure means for holding said current transformer units in spaced relation to corresponding ones of the high-voltage conductors respectively; each of said current transformer units including an individual iron core, and a secondary winding system mounted on said iron core; and, a plurality of control electrodes corresponding to respective ones of said plurality of current transformer units, each of said control electrodes being arranged with respect to the corresponding iron core to shield the same from the high-voltage of the corresponding high-voltage conductor.

2. The measuring transformer arrangement of claim 1, each one of said control electrodes being grounded.

3. The measuring transformer arrangement of claim 1, said structure means being configured so as to define a space between each one of said iron cores and the corresponding high-voltage conductor, each of said spaces communicating with the interior of the gas-filled tubular enclosure whereby the gas in the enclosure penetrating said spaces insulates said iron cores from corresponding ones of said high-voltage conductors.

4. The measuring transformer arrangement of claim 3, each one of said control electrodes being grounded.

5. The measuring transformer arrangement of claim 1 wherein the tubular enclosure has a longitudinal axis and constitutes a part of a high-voltage installation, said structure means being configured so as to accommodate said transformer core units one next to the other transversely to the longitudinal axis of the high-voltage installation.

6. The measuring transformer arrangement of claim 1 comprising voltage detection means arranged at least in part in said structure means.

7. The measuring transformer arrangement of claim 1, each of said control electrodes being at a potential near ground and being adjacent the corresponding high-voltage conductor so as to conjointly define therewith a high-voltage capacitor; and a low-voltage capacitor connected to said high-voltage capacitor, said high-voltage capacitor and said low-voltage capacitor conjointly defining a capacitive voltage divider.

8. The measuring transformer arrangement of claim 7, said low-voltage capacitor being mounted in said structure means.

9. The measuring transformer arrangement of claim 1, said structure means being a carrying body for accommodating therein said current transformer units and said control electrodes.

10. The measuring transformer arrangement of claim 9, said control electrodes being grounded.

11. The measuring transformer arrangement of claim 9, said control electrodes being at a potential near ground.

12. The measuring transformer arrangement of claim 11, each of said control electrodes being adjacent the corresponding high-voltage conductor so as to conjointly define therewith a high-voltage capacitor within said carrying body; and a low-voltage capacitor connected to said high-voltage capacitor, said high-voltage capacitor and said low-voltage capacitor conjointly defining a capacitive voltage divider.

13. The measuring transformer arrangement of claim 12, said low-voltage capacitor being mounted in said carrying body.

14. The measuring transformer arrangement of claim 12, said carrying body being an insulator body containing said current transformer units and said control electrodes therein; and potential shielding means for mutually decoupling said high-voltage capacitors.

15. The measuring transformer arrangement of claim 14, said potential shielding means comprising: a conductive coating applied to the outer surface of said insulator body, and a plurality of potential shields arranged inside said insulator body in spaced relation to corresponding ones of said control electrodes.

16. The measuring transformer arrangement of claim 15, said conductive coating and said potential shields being grounded.

* * * * *